United States Patent
Fogle

(10) Patent No.: US 6,983,543 B2
(45) Date of Patent: Jan. 10, 2006

(54) STRING TRIMMER HEAD

(75) Inventor: John R. Fogle, Carefree, AZ (US)

(73) Assignee: Rovert L. Phillips, Scottsdale, AZ (US), part interest ( * ) Notice: Subject to any disclaimer, the term of this patent is extended or adjusted under 35 U.S.C. 154(b) by 0 days.

(21) Appl. No.: 10/734,507

(22) Filed: Dec. 12, 2003

(65) Prior Publication Data

US 2005/0126017 A1 Jun. 16, 2005

(51) Int. Cl.
*A01D 34/416* (2006.01)
(52) U.S. Cl. .......................................... 30/347; 30/276
(58) Field of Classification Search ................. 30/276, 30/347; 56/12.7, 295
See application file for complete search history.

(56) References Cited

U.S. PATENT DOCUMENTS

| | | | |
|---|---|---|---|
| 4,054,992 A * | 10/1977 | Ballas et al. ................. 30/276 |
| 4,062,114 A * | 12/1977 | Luick .......................... 30/276 |
| 4,411,069 A * | 10/1983 | Close et al. .................. 30/276 |
| 4,571,831 A * | 2/1986 | White, III .................... 30/276 |
| 4,756,146 A | 7/1988 | Rouse | |
| 5,197,264 A | 3/1993 | Lacey | |
| 5,303,476 A * | 4/1994 | Tuggle ........................ 30/347 |
| 5,659,964 A * | 8/1997 | Lawrence .................... 30/347 |
| 5,836,227 A | 11/1998 | Dees | |
| 5,979,064 A | 11/1999 | Kitz | |
| 6,035,618 A | 3/2000 | Fogle | |
| 6,052,907 A * | 4/2000 | Wang .......................... 30/276 |
| 6,108,914 A | 8/2000 | Sheldon | |
| 6,293,350 B1 * | 9/2001 | Paolo .......................... 172/15 |
| 6,314,848 B2 | 11/2001 | Morabit | |
| 6,347,455 B2 | 2/2002 | Brant | |
| 6,401,344 B1 | 6/2002 | Moore | |
| 6,457,242 B1 | 10/2002 | Fogle | |
| 6,519,857 B1 | 2/2003 | Proulx | |
| 6,601,373 B1 * | 8/2003 | Legrand ....................... 56/12.7 |

FOREIGN PATENT DOCUMENTS

US 09738678 6/2002

* cited by examiner

*Primary Examiner*—Hwai-Siu Payer
(74) *Attorney, Agent, or Firm*—LaValle D. Ptak

(57) ABSTRACT

A head for a string trimmer machine includes a housing member having a central axis. The housing member is adapted for attachment to a string trimmer machine and includes a serpentine guide path in the housing for a length of trimmer line, with the guide path being located in a plane including the central axis of the housing and terminating in exit openings on opposite sides of the housing.

7 Claims, 5 Drawing Sheets

STRING TRIMMER HEAD

This invention relates to string trimmer machines, and more particularly, to a head for such machines.

DETAILED DESCRIPTION

Figure 1:
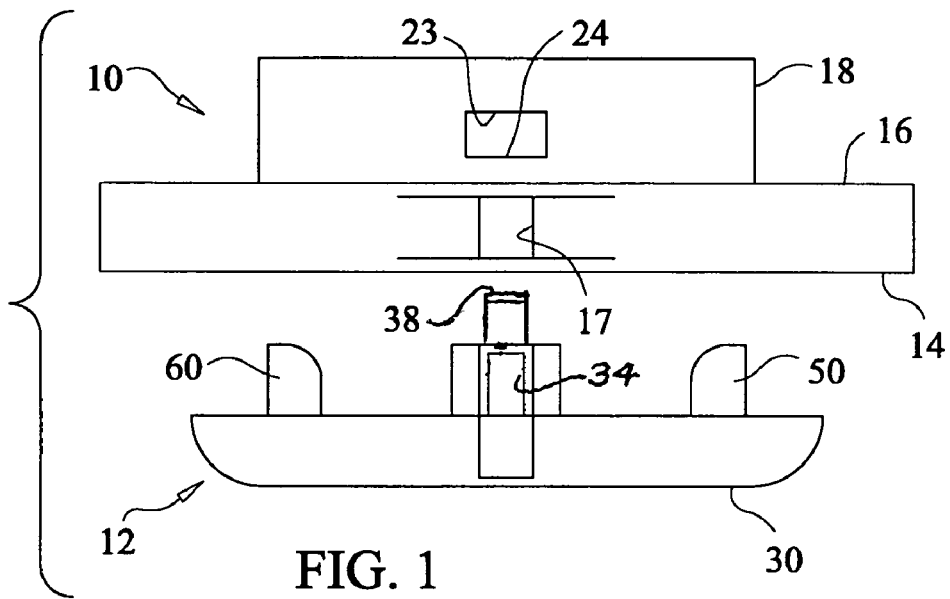
FIG. 1 is an exploded diagrammatic side view of a trimmer head according to an embodiment of the present invention.
Figure 2:
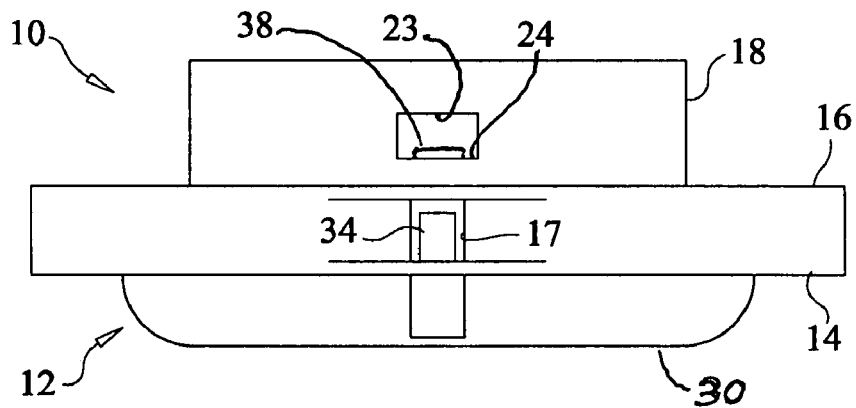
FIG. 2 is an assembled side view of the embodiment shown in FIG. 1.
Figure 3:
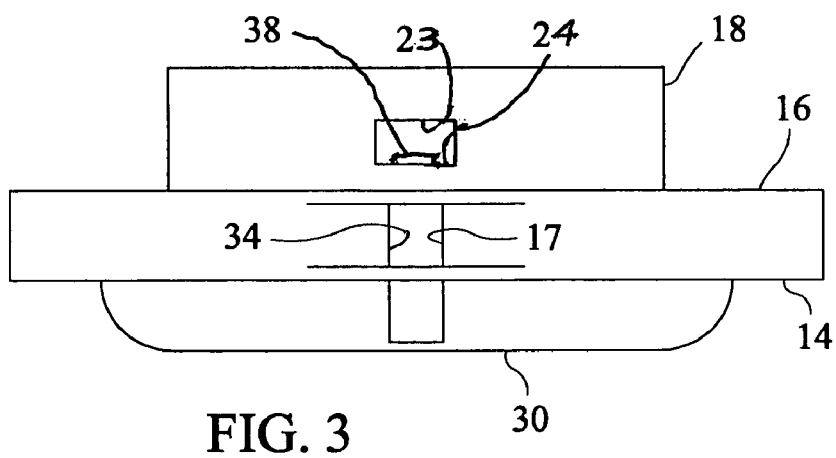
FIG. 3 is an assembled side view showing an alternative feature of the embodiment shown in FIG. 1.
Figure 6:
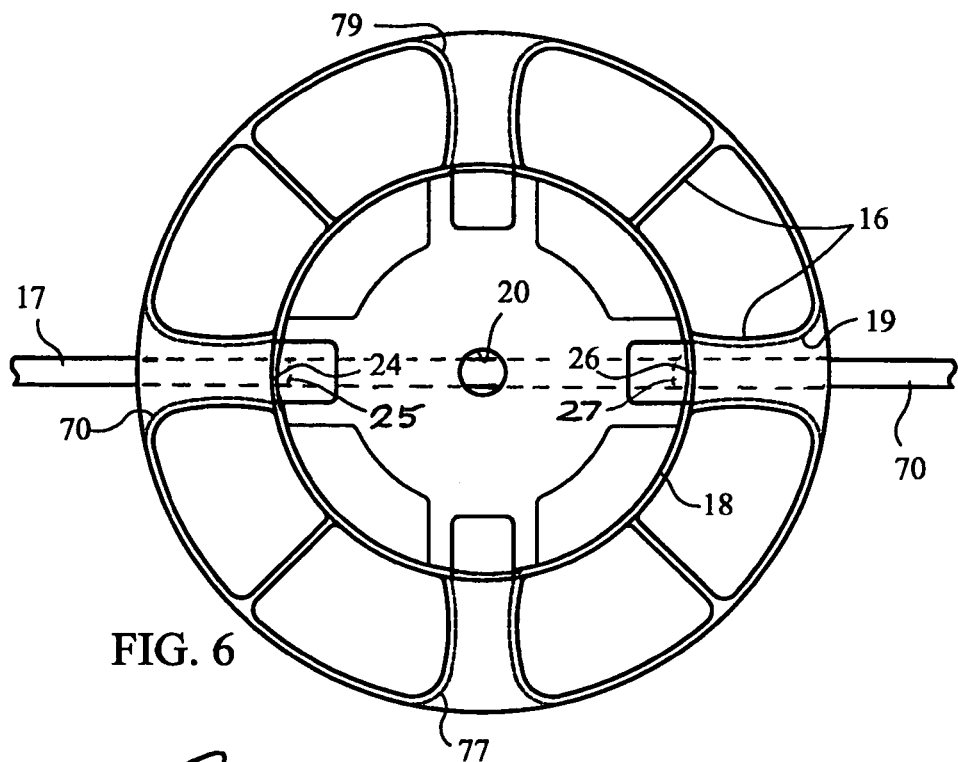
FIG. 6 is a top view of the embodiment shown in FIGS. 1 through 5.
Figure 7:
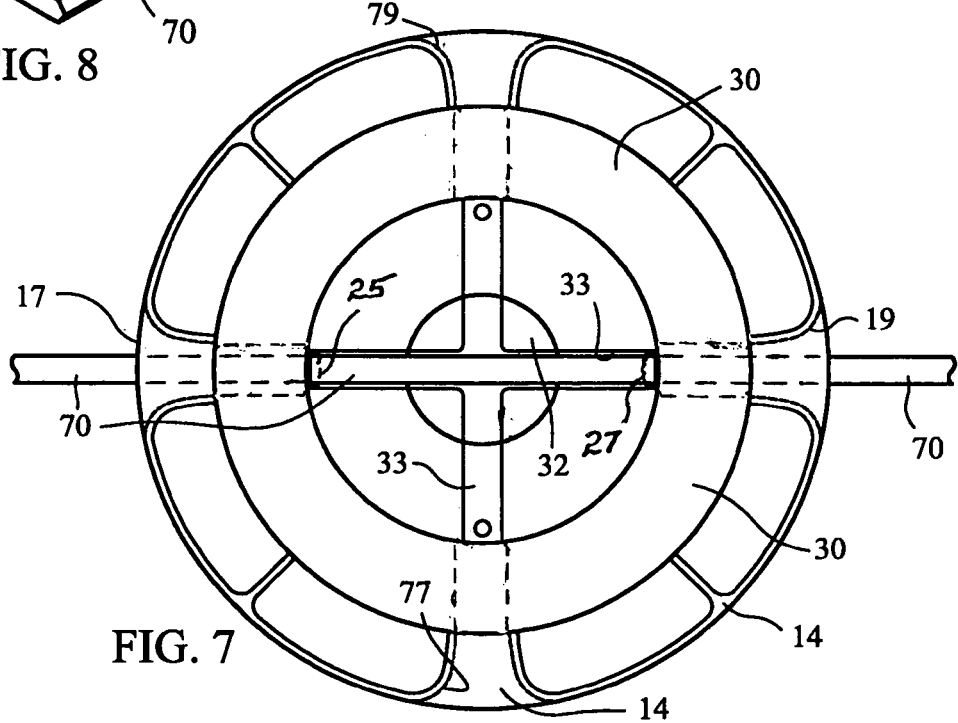
FIG. 7 is a bottom view of the embodiment shown in FIG. 6.

The same reference numbers are used throughout the different figures to designate the same or similar components. FIGS. 1, 2 and 3 diagrammatically illustrate components of an embodiment of the invention. These components are in the form of housing members 10/12 for a string trimmer machine. In FIGS. 1, 2 and 3, this housing member is shown in a side view. FIGS. 6 and 7 illustrate top and bottom views, respectively, of a version of the housing member in a cylindrical shape where the circular outer configuration is most clearly shown.

The upper portion 10 of the housing member includes a part 18 having an extended flange 14, 16 on it. The flange 14, 16 may have a greater diameter than the part 18. At the center of the part 18 is a depressed circular hole 20 (shown most clearly in FIGS. 4, 5 and 6), which may be used to attach the upper portion 10 of the housing member to the end of the drive shaft of a string trimmer machine. The string trimmer machine, with which the heads of FIGS. 1 through 7 and 9 through 13 are used, may be either a gas powered machine, an electric powered machine, or a machine powered by some other means, such as compressed air. The particular nature of the machine using the head is not important, since the head is capable of use with any type of string trimmer machine.

The head, as shown in FIGS. 1 through 7, includes a lower housing portion 12 including a ground-engaging plate 30 and a pair of upstanding guide ears 50 and 60, which fit into corresponding channels in the upper housing portion 10 of the head. On the periphery of the flange between the bottom 14 and the top 16, at least one pair of line exit openings 17 and 19 are provided on opposite sides. As is apparent from an examination of FIGS. 4, 5, 6 and 7, these openings 17 and 19 may be flared outwardly in the horizontal plane to reduce the stress placed on a string trimmer line or flexible trimmer blade extending from the openings when the head is operated to spin the string trimmer line or flexible blade into engagement with vegetation. If sufficient force is encountered by the line, it is pressed backwardly against the rounded or flared edge of the exit openings 17 or 19, thereby reducing the tendency for the line to break under stress in such a situation.

The upper portion 10 of the housing member includes an opening having an upper edge 23 and a lower edge 24, as indicated most clearly in FIGS. 1, 2 and 3. The lower portion 12 of the housing member includes an extension arm carrying an outwardly facing spring tab 38 on one side and an outwardly facing spring tab 40 on the other side, as shown most clearly in FIGS. 4 and 5. The spring tabs 38 and 40 are arranged to engage, respectively, the lower edge 24 of the opening on one side of the upper part 18 of the top portion of the housing member 10 and a corresponding edge 26 on the opposite side.

Figure 4:
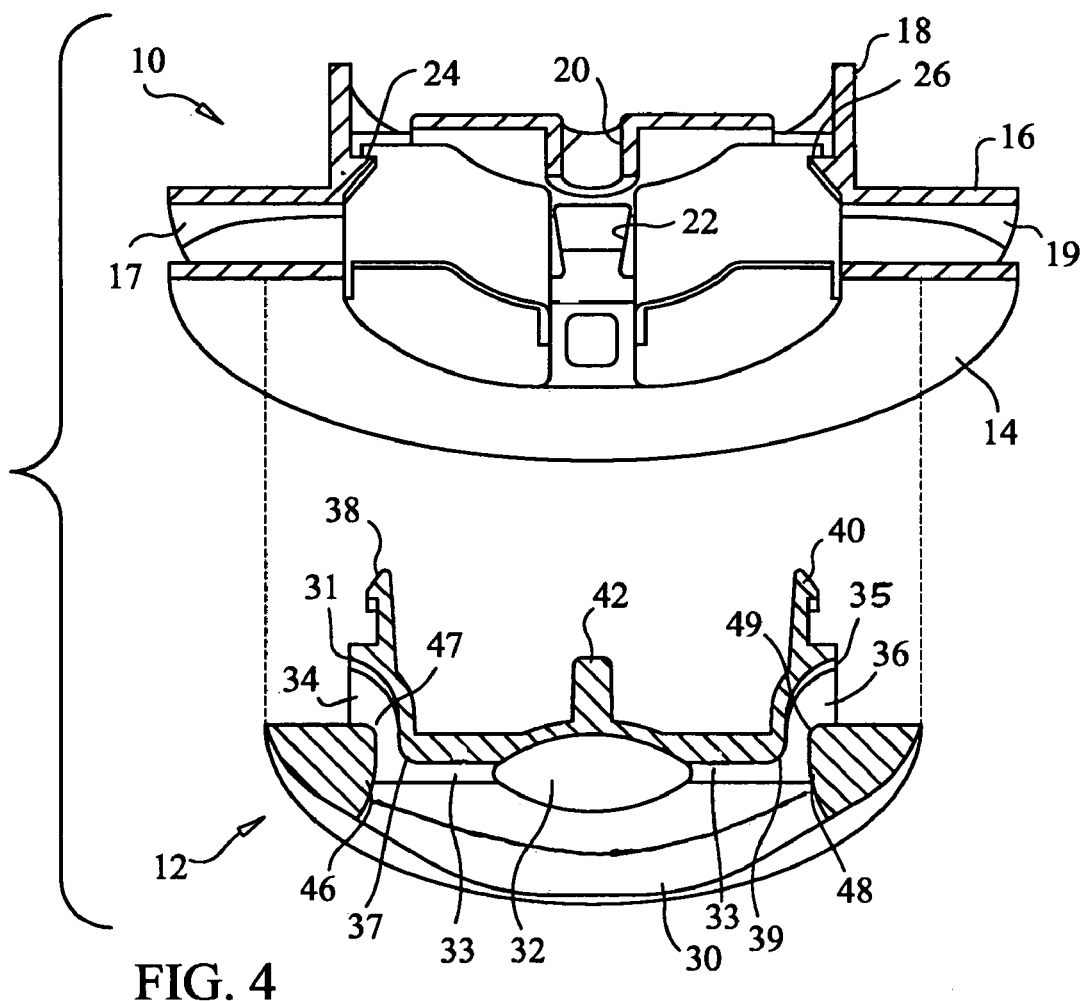
FIG. 4 is an exploded perspective cross-section of the embodiment shown in FIGS. 1 through 3.
Figure 5:
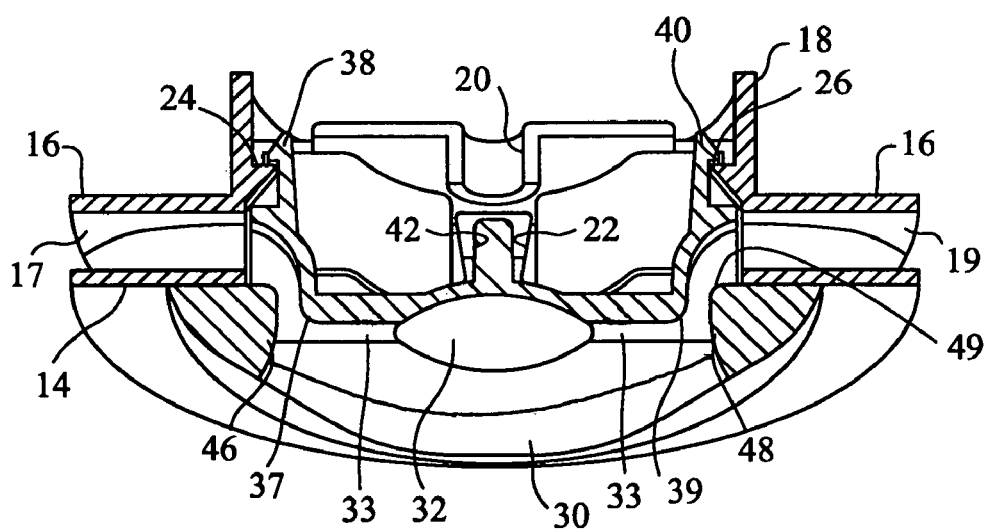
FIG. 5 is an assembled perspective cross-section of the embodiment shown in FIG. 4.

When the upper and lower housing portions are pressed together by moving the upper and lower portions 10 and 12 toward one another to the position shown in FIGS. 2 and 5, the ends of the spring tabs 38 and 40 engage, respectively, the edges 24 and 26 in the corresponding openings in the upper part 18 of the upper housing portion 10 to releasably hold the lower housing portion 12 into engagement with the upper portion 10 to form an integral housing. When release of the lower portion 12 from the upper portion 10 is desired, the spring tabs 38 and 40 may be pressed inwardly to disengage them from the edges or lips 24 and 26, thereby allowing the parts to be separated, as shown in FIGS. 1 and 4.

Although spring tabs 38 and 40 are shown for releasably interconnecting the housing portions 10 and 12 together, other releasable fasteners, such as over centering clamps, threaded fasteners, snaps or the like also may be used. The particular fastener shown is illustrative only and not limiting.

The lower portion 12 of the housing member includes part of a trimmer string guide path formed by channels 34 and 36 (shown most clearly in FIGS. 4 and 5) for guiding a string trimmer line or flexible trimmer blade upwardly through the channels 34 and 36 (as shown in FIGS. 4 and 5), and then outwardly through the opposing exit openings 17 and 19 between the upper and lower flanges 16 and 14, respectively on the upper portion 10 of the housing member. The guide path is shown most clearly in the assembled perspective cut away view of FIG. 5, which illustrates the communication of the channels 34 and 36 with the exit openings 17 and 19 respectively.

It should be noted that a guide for concentrically aligning the upper and lower housing portions 10 and 12 together on a common axis with the central axis through the opening 20 (and therefore, the central axis of the drive shaft of the string trimmer machine), is provided by a receptacle 22 in the upper portion 10 and an upstanding cylindrically shaped projection 42 on the lower portion 12 of the head. When the two portions 10 and 12 are assembled together as described previously, the projection 42 fits into the receptacle 22, and serves to align the parts along a common axis, which constitutes the central axis of the assembled head.

Figure 8:
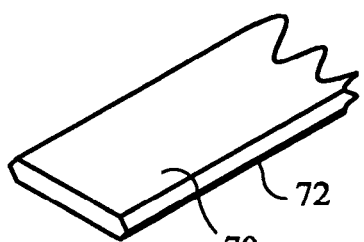
FIG. 8 is a representation of trimmer line useful in the embodiment of FIGS. 1 through 7.

The channels 34 and 36 are provided with dimensions corresponding to the line which is to be used with the head. While conventional circular cross section configuration line may be used, the head which is illustrated is particularly useful in conjunction with a flat line 70 having a generally rectangular cross section, as illustrated in FIG. 8. This line configuration is to be considered as illustrative, however, and not in any way as limiting, since the head construction is capable of use with lines of oval cross section, elliptical cross section, circular cross section, and others, as well as the generally flat rectangular cross section shown in the line of FIG. 8.

The line 70 of FIG. 8 has a rectangular cross section with a width greater than the height thereof, and with flat, pointed, or rounded edges 72 extending the length of the line. Different edge shapes may be used; and the relative dimensions of the cross section also may be varied in accordance with particular environments in which the line 70 is to be used.

Particularly in the case of a flat rectangular cross section line 70 of the type shown in FIG. 8, and other elongated ovals or elliptical shaped lines, it is useful to maintain the guide path of the line in the same plane as it passes through the head. In the embodiment shown in FIGS. 1 through 7, this is accomplished by providing a non-linear serpentine path through the head; so that the line does not have to be twisted or manipulated in any plane other than in a plane including the central axis of rotation of the head.

In the embodiment of FIGS. 1 through 7, access to this serpentine path is accomplished by providing a recessed opening in the ground-engaging plate 30 of the lower portion 12 of the head, either in the form of a generally totally open bottom, or by providing at least one channel to guide the line across the bottom (as shown most clearly in FIG. 7) and then upwardly through the corresponding channels 34 and 36 on each side of the lower portion 12 of the head to allow the line 70 then to exit through the exit openings 17 and 19 between the flanges 14 and 16, as shown most clearly in FIG. 5. This bottom channel is provided by a recess in the form of a circular depression 32 in the center of the plate 30 of the portion 12 and elongated grooves or channels 33 on each side extending through slot or hole openings 25 and 27 (as shown in FIG. 7) into the curved guide channels 34 and 36. The guide channels 34 and 36 include upper curved surfaces 31 and 35, respectively, to cause the ends of a line segment 70 inserted upwardly into each of those channels (as viewed in FIGS. 4 and 5) to turn and exit in a generally horizontal plane through the exit openings 17 and 19 in the upper portion 10 of the head housing assembly.

Insertion of a trimmer line 70, such as shown in FIG. 8, into the assembly involves taking a fixed length of line and inserting the opposite ends through the slots 25 and 27 into the respective channels 34 and 36 from the bottom of the portion 12. The line then is guided through the channel recess 32 as it is pushed into the head to allow the free ends to extend from the opposite sides from the exit openings 17 and 19. Once the line 70 begins to exit from these two exit openings, it may be pulled outwardly from opposite sides to cause the bight in the line to lie in the grooves or channels 33, as shown most clearly in FIG. 7.

Sufficient distance is allowed between the walls of the various components to allow this line insertion to be accomplished with minimal force; so that the line 70 may be inserted by hand and pulled into place by the operator of the string trimmer device using this head, without requiring any additional tools. At the same time, the serpentine path causes a fully inserted line to be pulled against the curved edge shoulders 37 and 47 adjacent the exit openings 17 and the corresponding curved edge shoulders 39 and 49 adjacent the exit opening 19 (as shown in FIGS. 4 and 5). Subsequently, during the operation of the machine, centrifugal forces and striking forces which would tend to pull the line or flexible trimmer blade 70 out of the machine cause these shoulders to be tightly frictionally engaged by the line; and the line is held firmly in place against slippage from one side to the other. The serpentine guide path through the head permits this operation without requiring tight clamping of the line into the head. When a line segment 70 becomes broken or worn, it is removed by engaging the bight of the line in the circular depression 32, and pulling it outwardly from the bottom of the housing part 12. This then prepares the head for the reinsertion of a new line segment, in the manner described above.

As shown in FIGS. 6 and 7, the configuration of the head also lends itself to the provision of at least one other trimmer line guide path, similar to or identical to the one described above, but oriented up to 90° to the one which has been described in conjunction with FIGS. 4 and 5, in particular. Such a line guide path is shown in FIGS. 6 and 7 adjacent opposed exit openings 77 and 79, which lie on a diameter of the head assembly located at right angles to the guide path for the exit openings 17 and 19 described previously. Consequently, a pair of trimmer lines or flexible trimmer blades 70 may be simultaneously extended through the head to exit outwardly through the openings 17, 19, 77 and 79 to provide four cutting edges; or in the alternative, the channel associated with the openings 77 and 79 may be provided with different dimensions for accommodating a smaller or larger line, or for accommodating a line having a different cross-sectional configuration from the configuration specifically shown for the line 70 in FIG. 8. The manner in which the line is inserted and removed from the head is the same.

In addition, for a given set of exit openings between the flanges 14 and 16, the configuration of the lower portion 12 of the head in conjunction with the channels 34 and 36 may be changed to accommodate lines of different sizes. This is diagrammatically illustrated in FIGS. 2 and 3, where a smaller channel 34 is shown associated with the exit opening 17 in FIG. 2, and a larger channel 34 is shown associated with the exit opening 17 in FIG. 3. In FIG. 3, the channel 34 and the exit opening 17 have substantially the same dimensions, as viewed from the outside edge of the head assembly. The height of the exit openings 17 and 19 is equal to or greater than the thickness or diameter of the string trimmer line or flexible trimmer blade.

Figure 9:
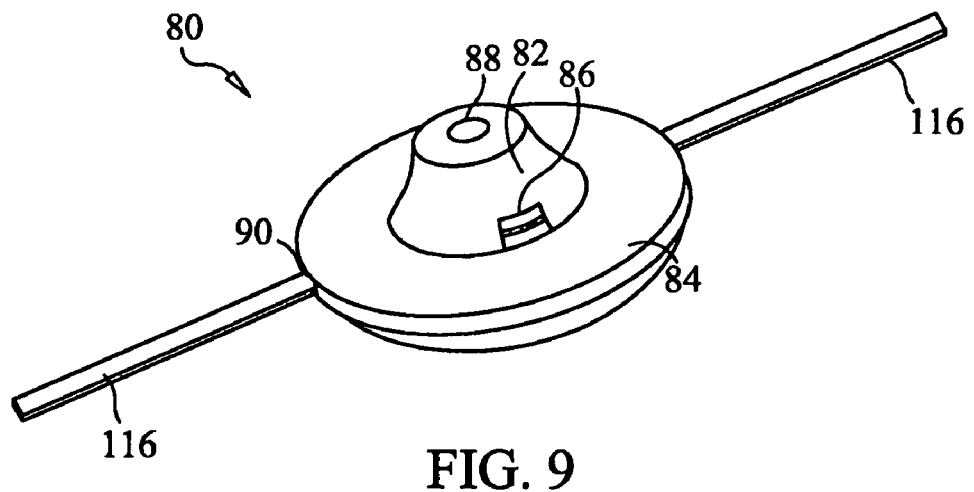
FIG. 9 is a top perspective view of another embodiment of the invention.

FIGS. 9 through 13 illustrate another embodiment of the invention. A perspective view of this embodiment is shown in FIG. 9; and it includes an upper portion 82, with a central opening 88 in it. The central opening is designed to be attached to the drive shaft of a string trimmer machine of the type described above. This opening 88 is on the central axis extending downwardly through the upper housing portion 82. The housing portion 82 has a pair of spring tab engaging openings 86 in it; and the lower end of the upper housing portion 82 extends outwardly in the form of a flange portion 84. Exit openings 90 are provided on diametrically opposite sides of the flange 84; and these exit openings 90 are similar in orientation and configuration to the exit openings 17 and 19 which have been described in detail in conjunction with the embodiment of FIGS. 1 through 7.

Figure 10:
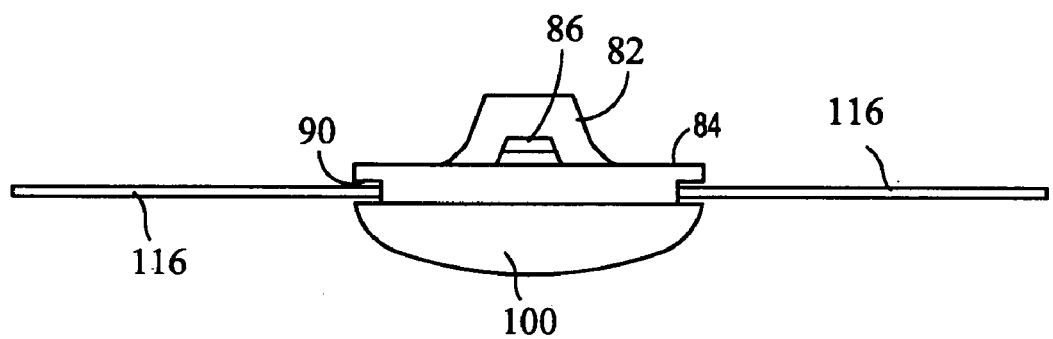
FIG. 10 is a side view of the embodiment shown in FIG. 9.
Figure 11:
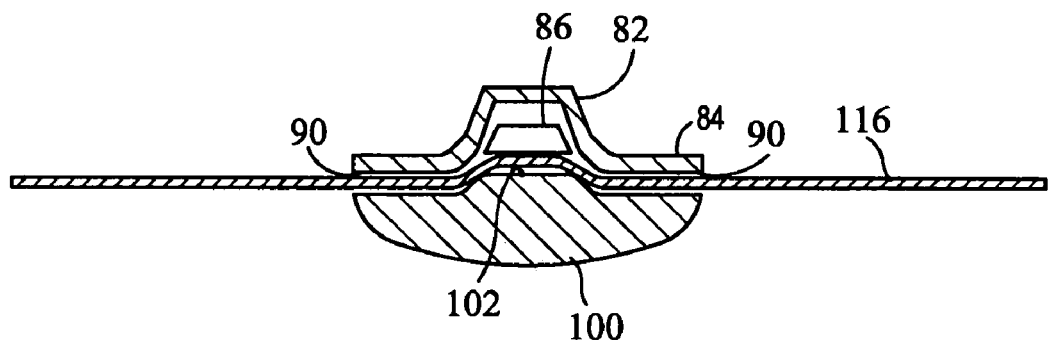
FIG. 11 is a cross-sectional view of the embodiment shown in FIG. 9.
Figure 12:
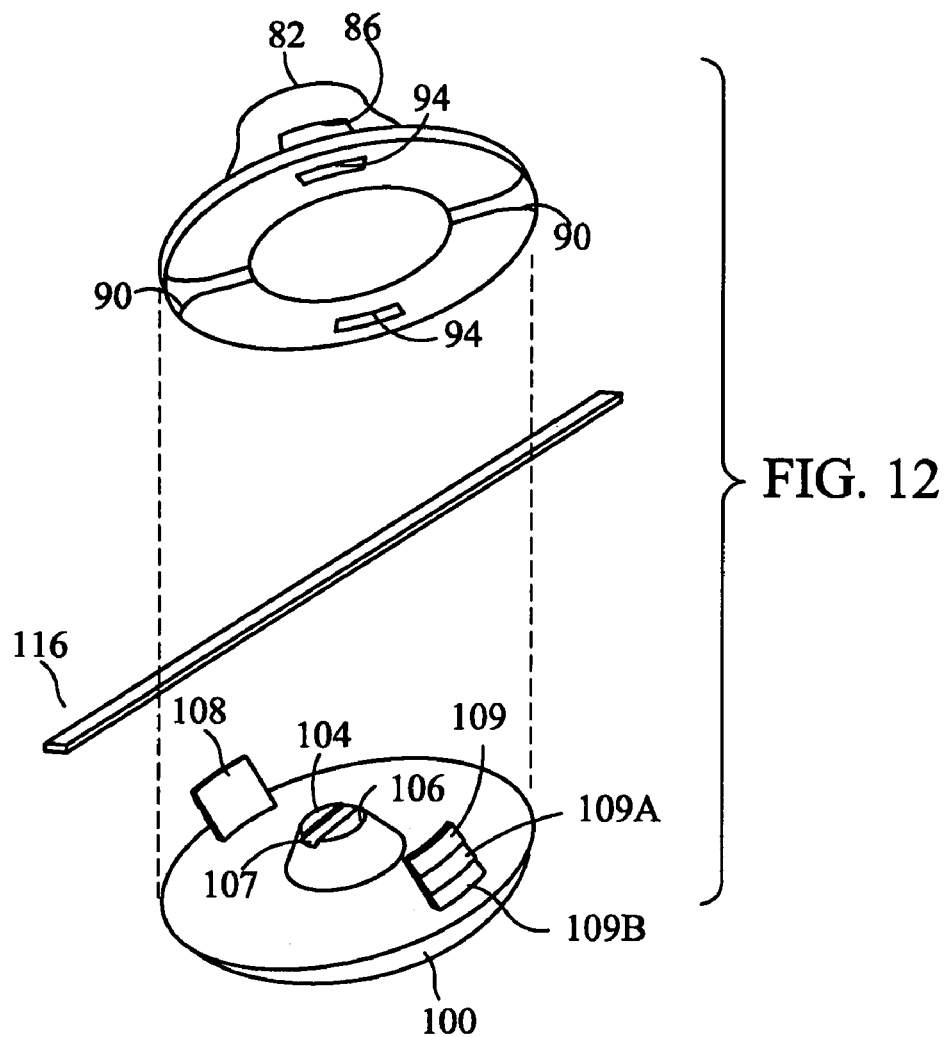
FIG. 12 is an exploded perspective view of the embodiment shown in FIGS. 9, 10 and 11.
Figure 13:
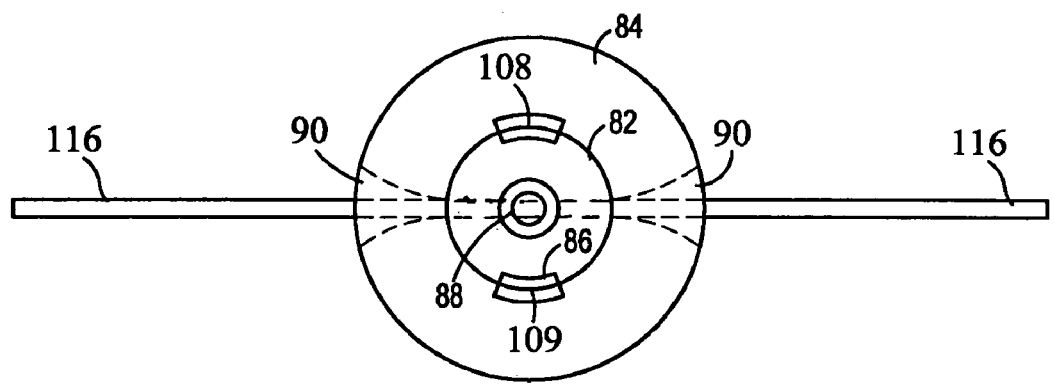
FIG. 13 is a top view of the embodiment shown in FIGS. 9 through 12.

A side view of the assembled configuration of the embodiment of FIGS. 9 through 13 is shown in FIG. 10 and in cross section in FIG. 11. This embodiment includes a ground-engaging lower housing portion 100, which has a central upwardly extending projection 102 on it. This projection extends into the hollow interior of the top portion 82. The ground-engaging lower housing portion 100 is held in place in the upper portion by means of spring tabs 108 and 109 located on opposite sides of the projection 102, as shown most clearly in FIG. 12. These tabs include projections at two different levels to accommodate string trimmer line of the type shown in FIG. 8 (or other string trimmer lines)to provide for ease of line loading. In the lowest tab position 109A as the exit openings 90 are in the same horizontal plane as a groove or channel 107 between guide members 104 and 106. In this position of the tab 109A (and a corresponding tab 108A on the other side), the parts 82 and 100 still are held together, but allow removal of spent line segments and insertion of new line segments 116 straight through the head, as indicated in FIG. 12, from one exit opening 90, over the slot 107, and through the other exit opening 90 on the opposite side. The appropriate tab extends into the openings 86 on opposite sides of the top 82, as illustrated in FIGS. 9 through 13.

In the structure of FIGS. 9 through 13, the line, shown as line 116 in all of these figures, is inserted through the slot 107 across the top of the lower housing portion 100 on the raised projection 102 between the pair of upwardly extending guide members 104 and 106, as shown in FIG. 12. Then the parts 82 and 100 are pressed together and held in place by means of the upper position for the spring tabs 108B and 109B in the openings 86 to force the line 116 into the serpentine configuration shown cross section in FIG. 11. The line 116 (in a serpentine configuration) is located in a plane of the axis of the assembly. Any attempt to pull the line 116 outwardly from either of the exit openings 90 on either side of the head causes the line 116 to engage opposing shoulders formed between the opposing edges of the projection 102 and mating edges downwardly extending from the hollow interior of the upper housing portion 82.

It should be noted that suitable slots or openings 94 are provided in the underside of the flange 84 of the upper housing portion to accommodate passage of the spring tabs 108 and 109. When line 116 needs to be replaced in the assembly shown in FIGS. 9 through 13, the spring tabs 108 and 109 are pressed inwardly to push them out of engagement with the edges of the openings 86 and the lower housing portion is lowered to the line loading position, where the tabs 109A and 108A engage the edges of the openings, whereupon the tabs are released. The old line segment is removed, and a new line segment 116 then may be inserted, as described above.

It also should be noted that the head may be made of metal, for both or either of the portions 10 and 12 of the embodiment of FIGS. 1 to 7 or for the upper and lower portions of the embodiment of FIGS. 9 to 13. High impact wear-resistant plastic, such as nylon or other suitable materials also may be employed. If high impact plastic is employed, the exit openings 17 and 19 or the shoulders 47 and 49 may be provided with metal ferrules or inserts to reduce fusing between the housing and the trimmer line or flexible trimmer blade 70 which is used in the operation of the head.

The foregoing description of the preferred embodiment of the invention is to be considered as illustrative and not as limiting. Various modifications will occur to those skilled in the art for performing substantially the same function, in substantially the same way, to achieve substantially the same result without departing from the true scope of the invention as defined in the appended claims.

What is claimed is:

1. A head for string trimmer machines including: a housing member having a central axis for attachment to a string trimmer machine; and a serpentine guide path in the housing member for receiving a length of trimmer line, the guide path located entirely in a plane including the central axis and terminating in exit openings on opposite sides of the housing member; the housing member including an upper housing portion releasably interconnected with a lower housing portion with the guide path formed by cooperating parts of the upper and lower housing portions; the lower housing portion having an upper side and a lower side, with the upper side thereof releasably interconnected with the upper housing portion and the lower side thereof exposing part of the guide path to permit insertion and removal of a segment of string trimmer line thereat.

2. A head according to claim 1 including a second serpentine guide path in the housing member located in a second place including the central axis, the second guide path terminating in a second set of exit openings on opposite sides of the housing member.

3. A head according to claim 2 wherein the guide paths are perpendicular to one another.

4. A head according to claim 1 wherein the releasable interconnection of the upper and lower housing portions of the housing member is effected by spring tabs extending upwardly from the lower housing portion with corresponding tab-engaging shoulders on the upper housing portion for releasable engagement by the spring tabs.

5. A head f or string trimmer machines including: a housing member having a central axis f or attachment to a string trimmer machine; and a first serpentine guide path in the housing member for receiving a length of trimmer line, the first guide path located entirely in a plane including the central axis and terminating in exit openings on opposite sides of the housing member; a second serpentine guide path, perpendicular to the first serpentine guide path, in the housing member located in a second plane including the central axis, the second guide path terminating in a second set of exit openings on opposite sides of the housing member.

6. A head for string trimmer machines including a housing member having a central axis and adapted for attachment to the drive shaft of a string trimmer machine; means in the housing member for guiding a length of string trimmer line in a serpentine guide path entirely in a plane including the central axis, the path terminating in exit openings on opposite sides of the housing member; and means for providing access to the serpentine guide path at a point intermediate the length of the guide path.

7. The head according to claim 6 wherein the cross-sectional configuration of at least a portion of the guide path is a rectangular cross section.

* * * * *